(12) United States Patent
Crawford (10) Patent No.: US 11,353,125 B2
(45) Date of Patent: Jun. 7, 2022

(54) FLUID CHECK VALVE (71) Applicant: Utex Industries Inc., Houston, TX (US)

(72) Inventor: Paul Crawford, Houston, TX (US)

( * ) Notice: Subject to any disclaimer, the term of this patent is extended or adjusted under 35 U.S.C. 154(b) by 114 days.

(21) Appl. No.: 16/884,417

(22) Filed: May 27, 2020

(65) Prior Publication Data
US 2021/0372536 A1 Dec. 2, 2021

(51) Int. Cl.
*F16K 15/03* (2006.01)

(52) U.S. Cl.
CPC ......... *F16K 15/03* (2013.01); *Y10T 137/7901* (2015.04)

(58) Field of Classification Search
CPC .................. F16K 15/03; F16K 2200/10; F16K 2200/101; Y10T 137/7901
See application file for complete search history.

(56) References Cited

U.S. PATENT DOCUMENTS

| 1,204,316 | A | * | 11/1916 | Renner | F16K 15/03 137/527.4 |
| 3,182,951 | A | * | 5/1965 | Kenneth | E03F 7/04 251/85 |
| 3,972,504 | A | * | 8/1976 | DiSabatino, Jr. | F16K 15/03 251/82 |
| 4,120,318 | A | * | 10/1978 | Jourdan | F16K 15/03 137/527.4 |
| 5,411,056 | A | * | 5/1995 | Solaroli | F16K 15/033 137/527.4 |
| 5,947,152 | A | * | 9/1999 | Martin | F16K 15/033 137/527.2 |
| 6,668,858 | B1 | * | 12/2003 | Bazargan | F16K 15/033 137/269.5 |
| 8,869,823 | B2 | * | 10/2014 | Mooney | F16K 15/03 137/454.2 |

* cited by examiner

Primary Examiner — Kevin F Murphy
(74) Attorney, Agent, or Firm — James Robert (Jim) Johnson (57) ABSTRACT

The invention comprises a flapper check valve assembly in which a flapper coated with an elastomeric seal is pivotably attached to a swing arm, and further in which the swing arm is pivotably attached to a retainer ring permitting two degrees of freedom of motion. The retainer ring is mounted in a check valve body. A novel mounting of the flapper to the swing arm ensures the flapper seals the pipeline against backflow.

10 Claims, 12 Drawing Sheets

FIG. 1

--PRIOR ART--

FIG. 2

--PRIOR ART--

FIG. 3

--PRIOR ART--

FLUID CHECK VALVE

FIELD OF THE INVENTION

The present invention relates generally to flow control devices. More specifically, the present invention is a fluid check valve which can be used in fluid transport systems to prevent fluid flow in a disfavored direction ("backflow") while permitting flow therethrough in a favored direction by the variable position of a closure member attached to a swing arm that permits flow when open (when the flapper and swing arm are in an "up" position) and stops flow when closed (when the flapper and swing arm are in a "down" position). By the use of a swing arm to position the flapper and the use of at least two pivot pins, the present invention ensures a fast, reliable seal when the closure member moves into the down position to prevent backflow. By the use of an elastomeric seal and sized pivot pin holes and pivot pins, the invention also reduces wear in the check valve and increases the service life of the check valve. The invention is designed for use in oil pipelines but is not limited to that area.

BACKGROUND OF THE INVENTION

A check valve is a mechanical device that permits fluid to flow in a pipeline in one direction only. The check valve is designed to open (and remain open) and allow fluid flow in one allowed direction but then to close quickly and reliably if the flow in the favored direction stops or reverses. Check valves typically operate passively. Fluid flow from the favored direction raises or moves the closure member to a position which does not impede flow. Thus, the fluid flow imparts some of its kinetic energy to the closure member (commonly called a "flapper"), which is converted to potential energy in the flapper by the effort necessary to hold the flapper in an elevated or other flow-permitting position. In other embodiments, the flapper may be spring operated. An applied fluid flow pushes the flapper away from the flow, extending the spring and imparting potential energy into the spring. If fluid flow stops, the potential energy in the flapper spring is released, causing the flapper into return to a closed position as potential energy is released from the spring.

The exemplary embodiment described in this disclosure operates without a spring (that is, by gravity), but the invention may generally be used in a range of types of check valves.

Check valves are grouped according to the way the closure member moves onto the seat. Flapper check valves (also known as swing check valves) are used extensively in a variety of oil and gas industry applications as control or safety devices. A flapper check valve comprises a flapper on a pivot pin, swing arm or some similar type of attachment. As depicted in the prior art, the flapper will commonly swing on a single pivot pin either onto the valve seat to block backflow or off the valve seat to allow forward flow. Other types of check valves include ball check valves and diaphragm check valves. The present invention relates to flapper check valves.

Figure 1:
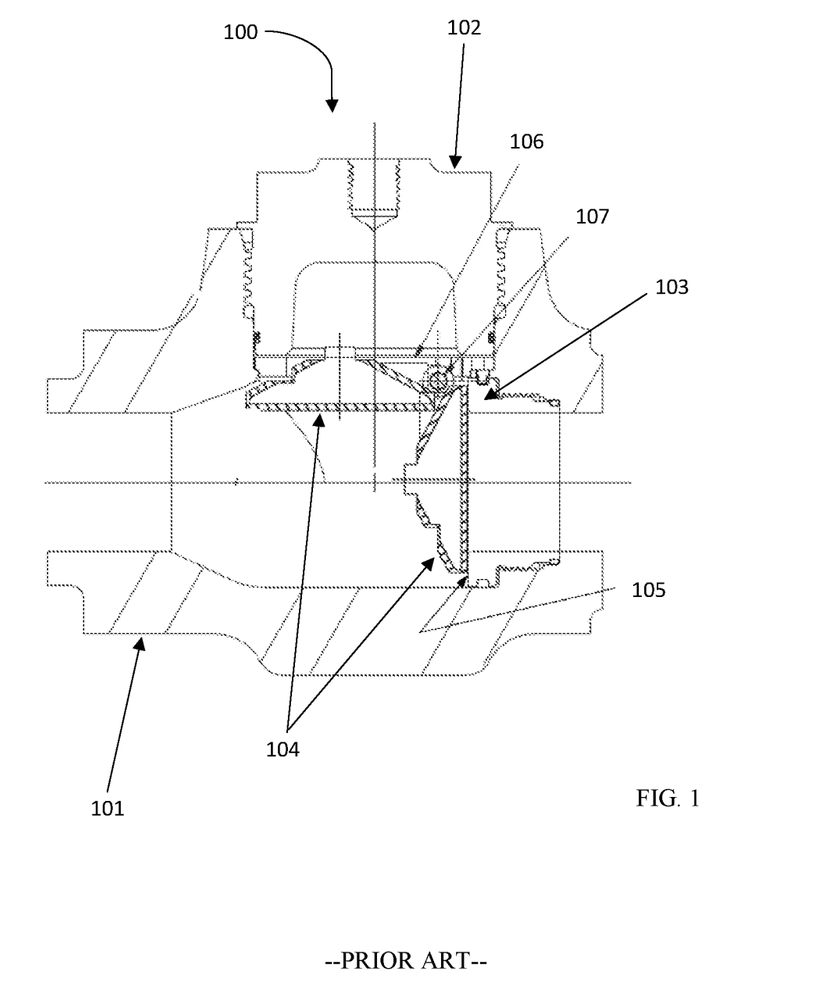
FIG. 1 depicts a drawing of a cutaway view of a prior art fluid check valve known in the field, further depicting the flapper thereof in an open position (fluid flow permitted) and a closed position (backflow prevented).

FIG. 1 depicts a typical example of a flapper check valve with the flapper depicted in each of the open position and the closed position. The flapper in FIG. 1 is pivotably connected to a retainer ring, or "halo," by a single pivot pin connected at the edge of the flapper. The flapper is shaped to fit sealably onto a valve seat when in a closed position and further comprises an elastomeric coating disposed on the face of the flapper. This elastomeric coating helps to seal the fluid channel when the flapper is pressed onto the valve seat surface of the valve body.

Figure 2:
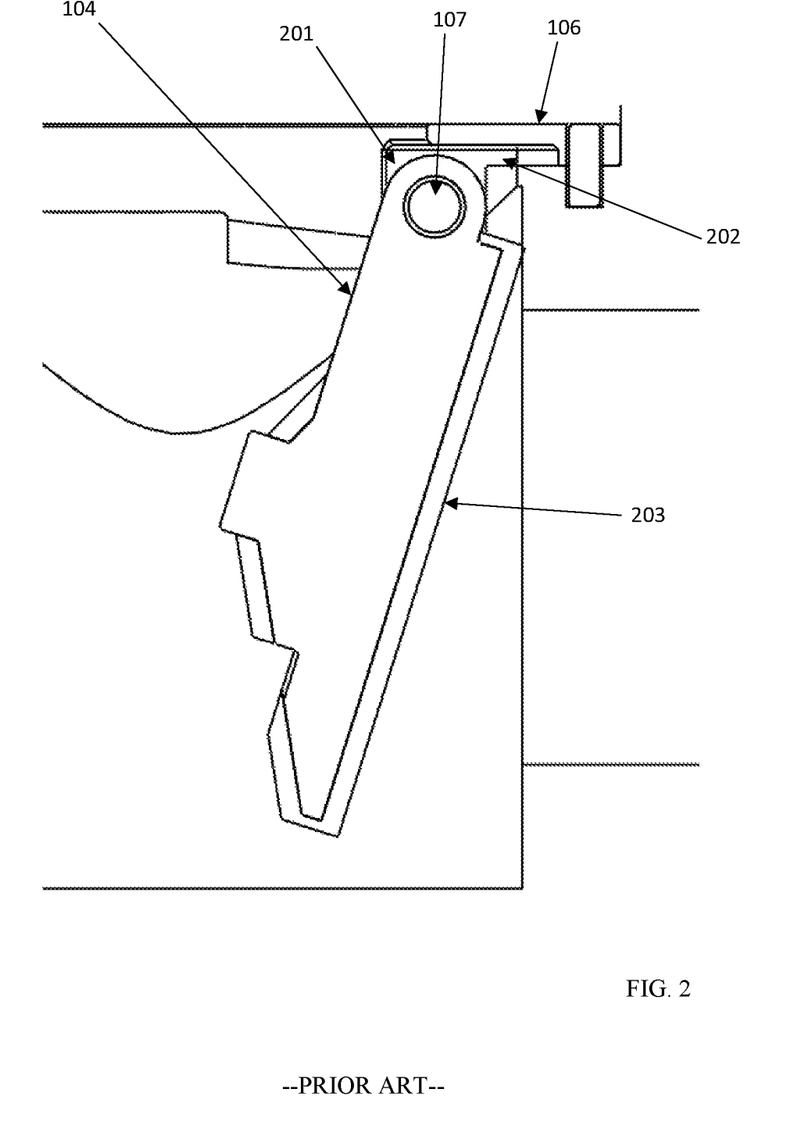
FIG. 2 depicts a detail of the prior art check valve depicting the edge of the flapper proximate to the pivot pin in contact with the valve seat surface.

This form of known fluid check valve is associated with several drawbacks. As shown in FIG. 2, when the flapper is swung onto the valve seat surface, the top portion of the elastomeric coating is brought into contact with the valve seat surface before the rest of the flapper is in position to block the entire fluid channel. This initial contact between a portion of the elastomeric seal may prevent or hinder the flapper from moving fully toward a closed position.

Figure 3:
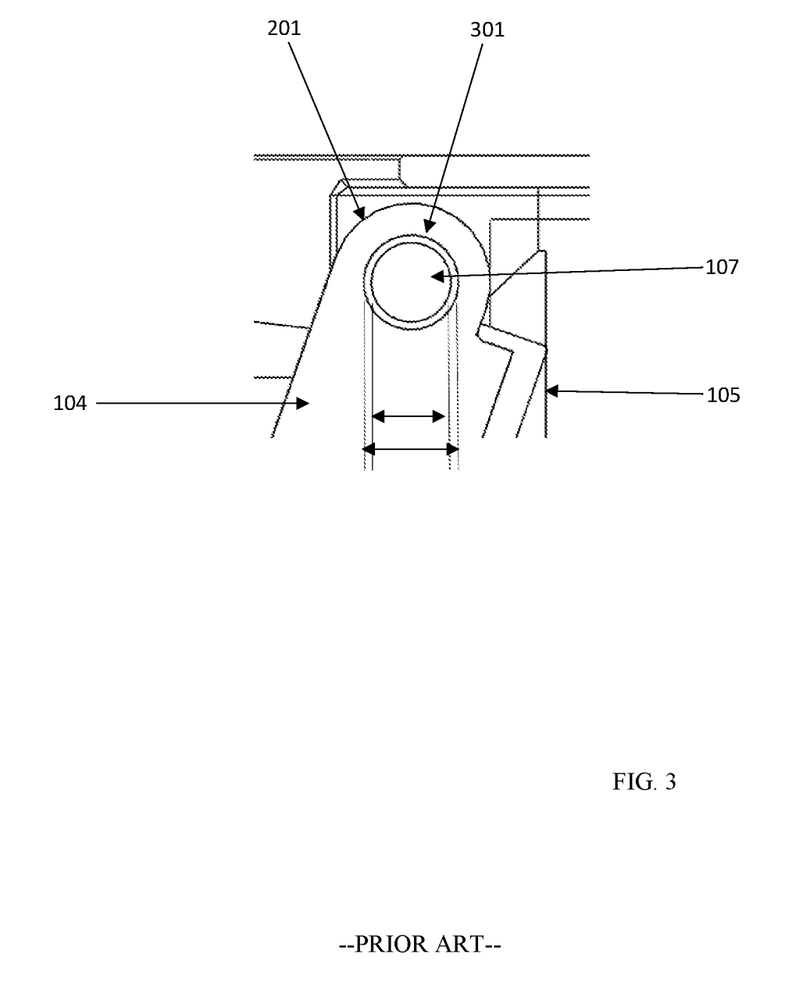
FIG. 3 depicts an additional detail of the prior art check valve depicting the size difference between the pivot pin and the pivot pin hole.

In order to avoid or eliminate this negative effect and thereby to ensure the flapper approaches the valve seat surface in close to a parallel orientation, the prior art depicted in FIG. 1 employs a pivot pin hole in the flapper and/or halo which is larger in diameter than the pivot pin. This is depicted in FIG. 3. As fluid flows through the fluid channel, the flapper and pivot pin are pushed by the fluid flow downstream in the extra-large pivot pin hole. This draws the entire flapper downstream (slightly) and away from the valve seat surface. The size of the pivot pin hole relative to the pivot pin permits the top edge of the flapper that would otherwise touch the valve seat surface as the fluid flow drops to zero to miss the valve seat surface (or more of the valve seat surface).

This design, however, is subject to failure. The necessary clearance between the pivot pin hole and the pivot pin allows debris from the fluid to enter the gap between the pivot pin and the inner surface of the flapper's pivot pin hole. This may either cause wear between those parts or limit the ability of the flapper to close fully. Either way, the service life of this design of fluid check valve is limited. As a result, the fluid check valve requires more maintenance and is more likely to fail, causing accidents. In some embodiments of the prior art, prior check valve makers have placed seals between the halo and the flapper to cover the pivot pin and pivot pin hole to prevent debris from entering the gap between the pivot pin hole and pivot pin. Even with such a seal, the different in diameters between the pivot pin hole and pivot pin creates a wobbling effect during operation that itself wears down those parts. This may either increase the size of the pivot pin hole or wear down the pivot pin and, in time, cause those parts to fail.

A significant limitation in the design of the single pivot pin flapper assembly, even with a pivot pin hole larger than the pivot pin lies in the substantially single degree of freedom of motion allowed by the pivot pin. There is only a single orientation of the flapper relative to the seat on which the flapper rests to close the pipe from backflow. In the event of a worn seal, the flapper has no motional freedom to seat in a sealed way.

There is a need for a fluid check valve which can reliably close and seal a fluid channel that eliminates a gap between a pivot pin hole and a pivot pin and which has more than one degree of motional freedom.

SUMMARY OF THE INVENTION

The present invention is a fluid check valve designed to ensure a secure seal between a flapper and a valve seat surface using a flapper and swing arm in which the design of the swing arm affixed to the flapper and the design of the connection of the flapper to the swing arm and the swing arm to a mounting ring to permit the flapper to approach the valve seat surface in close to a parallel orientation through the use of two degrees of freedom of motion of the invention. Further, the connection between the swing arm and the flapper is encased in a flexible elastomeric seal to prevent the infiltration of debris into the connection, which allows the invention to avoid the type of damage experienced in the prior art.

DETAILED DESCRIPTION OF THE INVENTION

Referring first to FIG. 1, a check valve 100 known in the industry is depicted. Therein, a valve body 101 is designed to have retained by it or threadedly attached to it a valve nut 102 and a valve seat nut 103. The valve seat nut 103 is threaded into a threaded hole in the valve body 101 to provide a seating surface 105 on which to seat a flapper 104 to shut off access to a portion of a pipeline in which the check valve 100 is installed. Referring also to FIG. 2, flapper 104 has disposed at its outer perimeter a pivot pin holder 201. A halo 106, which is designed to hold the flapper 104 assembly in position in the valve body 101, has disposed on it a pivot pin mount 202. The flapper 104 is pivotably attached to the halo 106 by connecting the pivot pin holder 201 of the flapper 104 to the pivot pin mount 202 of the halo 106 using a pivot pin 107. The valve nut 102 closes a hole disposed in the valve body 101 to provide access to the interior of the valve body 101 to insert or remove the flapper 104 and halo 106 assembly. This hole also permits the insertion or removal of the valve seat nut 103.

Referring still to FIG. 1 and FIG. 2, a design limitation of the prior art is seen. So long as fluid flows through the valve in the favored direction, flapper 104 is pivoted on the pivot pin 107 in an "up" position and away from the seating surface 105 of the valve seat nut 103 and next to the halo 106. In the event fluid flow in the favored direction ceases, flapper 104 drops into position against the seating surface 105 of the valve seat nut 103 to seal off backflow. It is noted flapper 104 has disposed on most of its surface and in particular on the portion of the surface of the flapper 104 intended to make working contact with the seating surface 105 an elastomeric seal 203. Pressure caused by any backflow in the pipeline compresses the elastomeric seal 203 against the seating surface 105 to form a tight seal in the check valve 100. In the standard design of the prior art check valve 100, when the flapper 104 is in the process of dropping into the closed position, a portion of the elastomeric seal 203 makes direct contact with the seating surface 105 before the flapper 104 is in final position. This can adversely affect the ability of the flapper 104 to make a secure seal against the seating surface 105. To compensate for this limiting contact by the elastomeric seal 203 against the seating surface 105, and referring to FIG. 3, pivot pin 107 has a diameter smaller than the diameter of the hole comprising the pivot pin holder 201 in the pivot pin mount 202 of the flapper 104. This results in a gap 301 between the pivot pin 107 and the pivot pin mount 201 that permits the flapper 104 to be pushed away from the seating surface 105 the distance of the gap 301 (technically, half the distance of the full gap 301 when the pivot pin 107 is centered in the pivot pin mount 201). Resistance to compression from the elastomeric seal 203 where the elastomeric seal 203 is pressed against the seating surface 105 causes the flapper 104 to be pushed away from the seating surface 105 to allow the flapper 104 to fall into the closed position against the seating surface 105.

The limitation of this design is the gap 301 itself. Oil or other fluids pumped through pipelines commonly have minute debris in the flow. If the debris is small enough to get caught in gap 301, it can impair or prevent the proper operation of the flapper 104. Similarly, debris in the gap 301 can abrade the metal in the device, causing premature failure. Likewise, debris in the gap 301 can fill the gap 301 so as to prevent the motion of the pivot pin mount 201 relative to the pivot pin 107. Sealing the assembled pivot pin 107, pivot pin mount 201 and pivot pin holder 202 can prevent the intrusion of debris but would reduce the functioning of the pivot pin 107, pivot pin mount 201 and pivot pin holder 202. Prior check valve makers have placed seals between the halo 106 and the flapper 104 to cover the pivot pin 107 and pivot pin hole to prevent debris from entering the gap between the pivot pin hole and pivot pin. Even with such a seal, the different in diameters between the pivot pin hole and pivot pin creates a wobbling effect during operation that itself wears down those parts. This may either increase the size of the pivot pin hole or wear down the pivot pin and, in time, cause those parts to fail.

While in a sense the prior art flapper assembly allows two degrees of freedom of motion, it is proper to consider only one degree of freedom of motion is fully functional. Rotational motion is generally fully usable by the device, but the freedom of motion of the pivot pin mount 201 relative to the pivot pin 107 is limited. For example, in the event of debris in the flow, there may be no motional freedom therein. Likewise, in the event of a worn elastomeric seal 203, the two degrees of freedom of motion in the flapper assembly will not operate to permit the flapper to reorient itself to account for seal wear.

Figure 4:
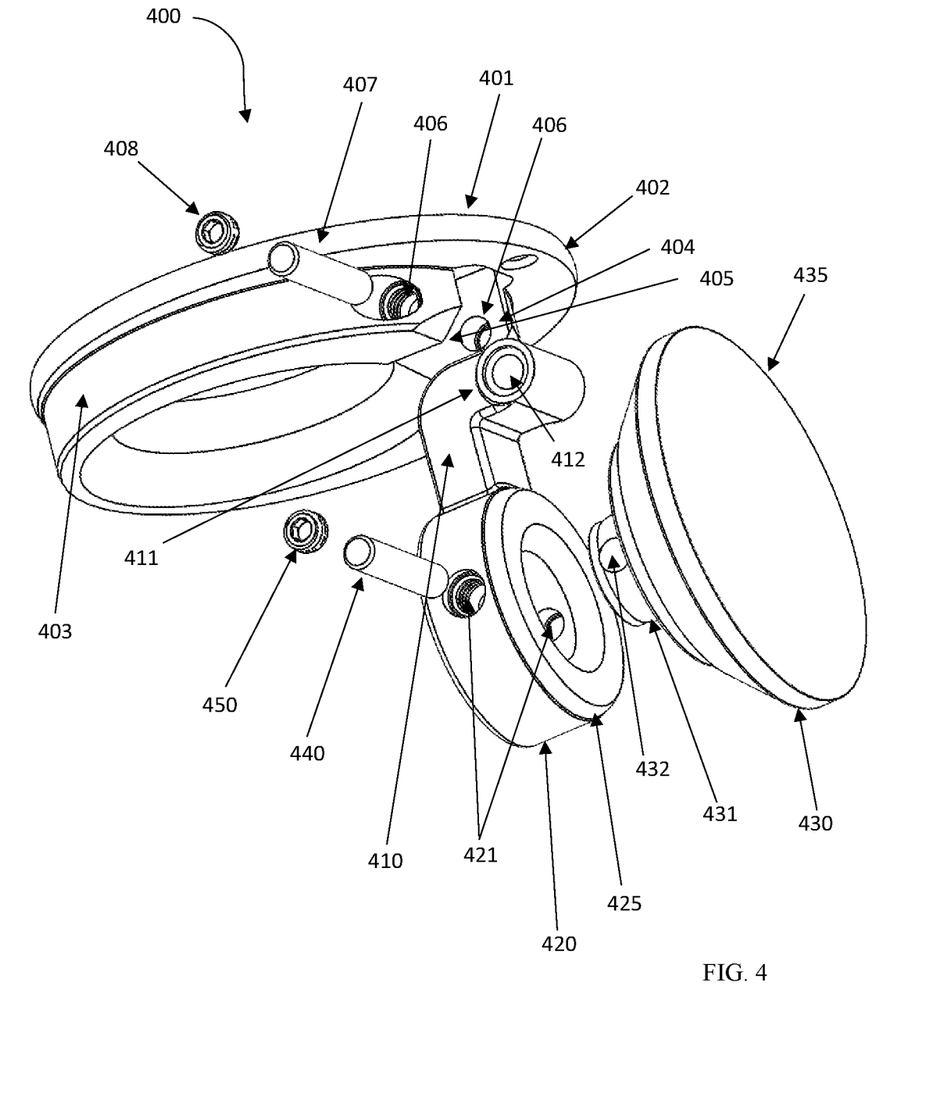
FIG. 4 depicts an exploded perspective view of the parts of the flapper arm assembly of the present invention.
Figure 5:
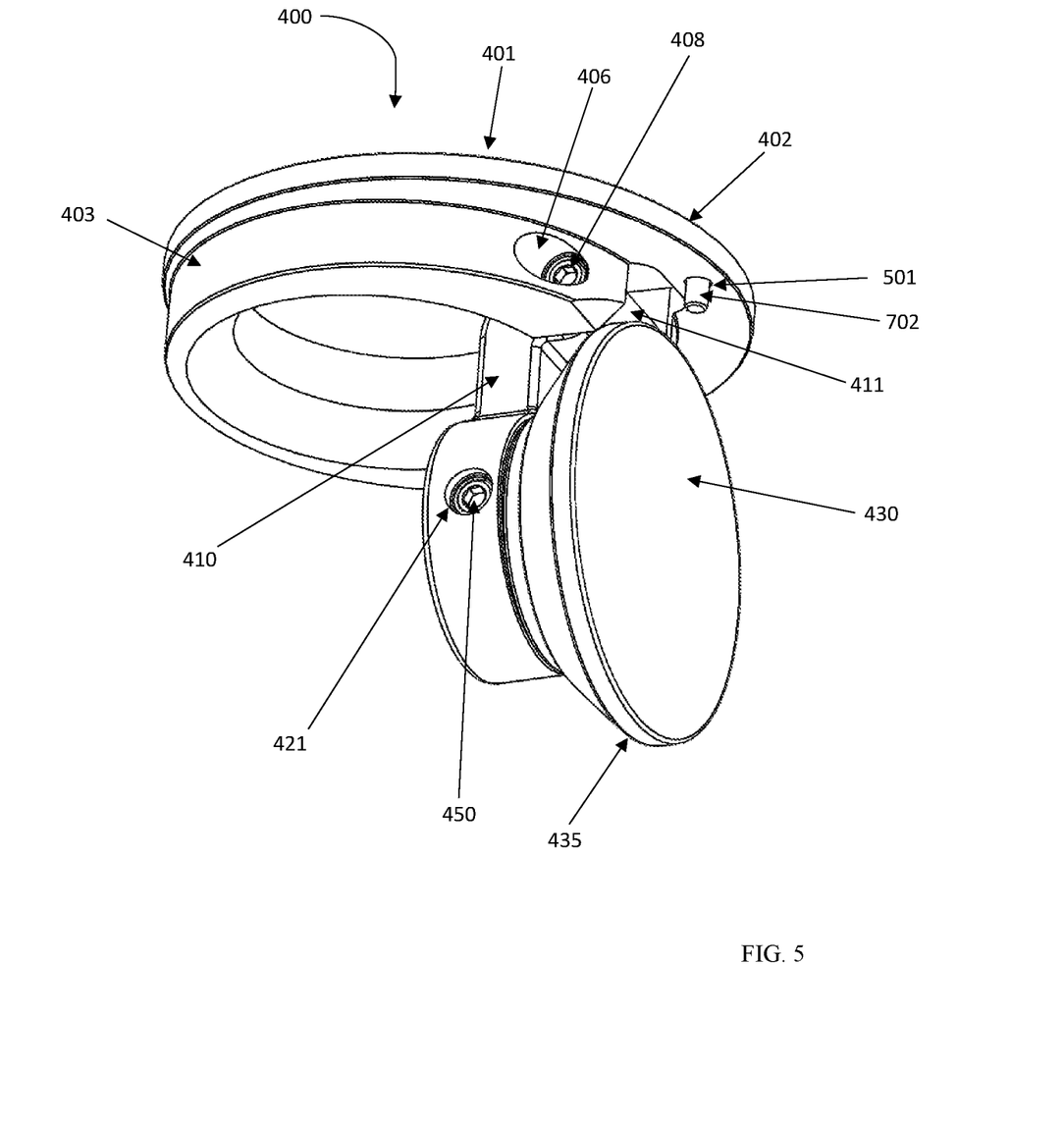
FIG. 5 depicts a perspective view of the assembled parts of the flapper arm assembly of the present invention.

Referring now to FIG. 4 and FIG. 5 together, the elements of the flapper assembly 400 of the invention are depicted.

Therein, a mounting ring 401 is disclosed. The mounting ring 401 is essentially a hollow cylinder with a height, a diameter and a flange 402. The mounting ring 401 further comprises a vertical wall 403. The flange 402 of the mounting ring 401 is in the form of a closed circle. The wall 403 of the mounting ring 401 is in the form of an open circle having a first vertical side 404 and a second vertical side 405. The wall 403 of the mounting ring 401 is thickened proximately to first vertical side 404 and second vertical side 405 sufficient to permit a partially threaded hole 406 to be incorporated therein. Partially threaded hole 406 is made by drilling a hole through the wall 403 proximate to, perpendicular to, and through second vertical side 405 and then perpendicularly into first vertical side 404 but not then passing out the wall 403 proximate to the first vertical side 404. That is, the portion of hole 406 bored into the wall 403 started at the first vertical side 404 is a blind hole. Hole 406 has a total length (including the gap in the wall 403) and a diameter sufficient to allow the full insertion therein of pin 407. Hole 406 is threaded on the through-hole side of hole 406 drilled proximal to second vertical side 405. The thread serves to permit the threading therein of a set screw 408 to retain the pin 407 in place in the hole 406.

The flapper assembly 400 of the invention further comprises a swing arm 410 having an "L" shape and having a first end and a second end. Disposed at the first end thereof is a pivot pin mount 411. Pivot pin mount 411 has disposed therein a pin hole 412 with an inner diameter sized to permit the insertion of pin 407 therein to assemble swing arm 410 to mounting ring 401 when pin 407 is inserted into hole 406. The L-shape of the swing arm 410 is designed to permit attachment of the second end of the swing arm 410 along approximately the axis of the flapper 430, described below.

The swing arm 410 has a second end, at which is disposed a flapper mount 420. Flapper mount 420 comprises a fixedly mounted or integrated disk having a diameter and thickness suitable to serve its purposes as described herein. As depicted in FIG. 4, flapper mount 420 has disposed on one side thereof a blind hole having a diameter and a depth sufficient to permit the mounting of the flapper 430 as described below.

To ensure alignment of the flapper assembly 400 for use in the invention, hole 406 in the mounting ring 401 is disposed therein parallel to the flange 402. Likewise, pin hole 412 of the first end of the swing arm 410 is disposed to hold the L-shaped swing arm 410 perpendicularly to the pin hole 406. Swing arm 410 has disposed therein a partially threaded hole 421 drilled to lie across a diameter of the flapper mount 420 disk so as to be parallel, when assembled, to pin hole 406. Pin hole 421 in flapper mount 420 is designed similarly to hole 406. One end of pin hole 421 is drilled in from the outer wall of flapper mount 421 along the diameter line of the flapper mount 420 and through the wall of the blind hole in which the flapper 430 is mounted. Pin hole 421 also comprises a blind hole disposed along the same diameter of the flapper mount 420. Pin hole 421 has a diameter and total length thereof sized to permit insertion of flapper pin 440. Pin hole 421 has disposed thereon on the through hole element a partial thread sufficient to permit a set screw 450 to be threaded into place to retain the flapper pin 440.

Figure 7:
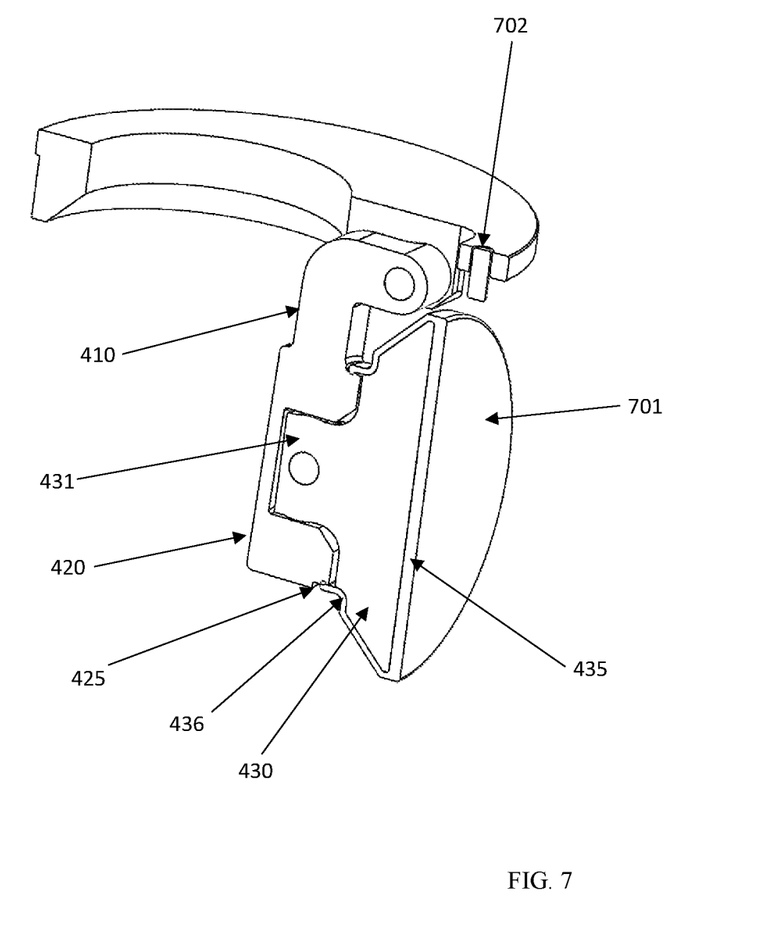
FIG. 7 depicts a cutaway perspective view of the flapper assembly of the present invention.

Referring in addition to FIG. 7, it is seen the flapper 430 is in the form generally of a right cone, having a first, flat end formed by the bottom the cone and a shaped second end 431 designed to fit into the blind hole of the flapper mount 420. The shaped second end 431 of the flapper 430 has disposed therein a flapper pin hole 432 drilled across and through a diameter of the shaped second end 431 so that flapper pin 440 can be inserted into the through hole element of pin hole 421, then into and through flapper pin hole 432 and then into the blind hole element of pin hole 421 in order to retain the flapper 430 functionally in the flapper mount 420 of the flapper arm 410. Flapper 430 has an (imaginary) axis which projects perpendicularly from the center of the first flat end thereof through the center of the shaped second end 431.

In alternate embodiments of the invention, flapper 430 may be an oblique cone or other suitable shape. In that event, flapper mount 420 and the second end thereof, as well as flapper mount 420, must be designed to permit operational assembly of the parts.

Referring now to FIG. 5, the assembled flapper assembly 400 is depicted. Therein, hole 406 of the mounting ring 401 is aligned with pin hole 412 of pivot pin mount 411 on the first end of the swing arm 410. When aligned, pin 407 is inserted into the through hole element of hole 406 and then in and through pin hole 412. The pin 407 is inserted into the blind hole element of hole 406. Then set screw 408 is threaded into the threads of the through hole element of hole 406 to secure the pin 407. Similarly, to mount the flapper 430, flapper pin hole 432 is aligned with pin hole 421. Flapper pin 440 is then inserted in and through the through hole element of pin hole 421, then into and through flapper pin hole 432 and then into the blind hole element of pin hole 421. Once in place, set screw 450 is threaded into place in the threads of pin hole 421.

As depicted in each of FIG. 4, FIG. 5 and FIG. 7, the bottom and side of the conic element of flapper 430 has disposed thereover an elastomeric coating 435. As depicted best in FIG. 7, the elastomeric coating 435 is disposed over the flat bottom of the conic element of flapper 430, over the side of the conic element of the flapper 430 and projects past the end of the end of the side of the conic element of the flapper 430, as further described. Still referring to FIG. 7, it is noted again the flapper 430 has disposed at its first end a flat bottom from which extends a generally conical element and a shaped second end 431 designed to fit into the blind hold of the flapper mount 420. Flapper mount 420, as described above, is in generally a disk shape. Referring also to FIG. 4, on the outer edge of the disk forming the flapper mount 420 and on the same side of the disk in which is disposed the blind hole which receives the shaped second end 431 of the flapper mount 420 there is cut into the disk a thin, flat groove 425. Thin, flat groove 425 has a depth and width defined relative to the shape of the second end 431 of the flapper 430 as further described hereinbelow. That is, the disk of flapper mount 420 in general has a diameter. At the place on flapper mount 420 where the thin, flat groove 425 is disposed, flapper mount 420 has a slightly smaller diameter than the remainder of flapper mount 420. The difference between these two diameters is approximately twice the thickness of elastomeric coating 435. Further, as depicted in FIG. 7, the side of the conic element of flapper 430 ends at a point on the flapper 430 where there can be formed a circular conical section having a diameter equal to the diameter of the flapper mount 420 in the part of the flapper mount 420 where thin, flat groove 425 is disposed.

Referring to FIG. 7, the transition from the side of the conic element of the flapper 430 to the circular conic section is accomplished using a rounded indentation 436, which circles the circular conic section. The functionality of these design elements is seen in the extent to which the elastomeric coating 435 is applied to the flapper 430. Specifically, the elastomeric coating 435 extends across the flat bottom of the flapper 430, up along the side of the conic element thereof, into the rounded indentation 436, and then projects past the circular conic section of the flapper 430, as depicted, and onto the end of the flapper mount 420. The projection of the elastomeric coating 435 is sized to fit snugly into the thin, flat groove 425 formed in the flapper mount 420. This seals the connection between the flapper 430 and flapper mount 420. The seal formed prevents the intrusion of debris into that connection, thereby functioning to prevent wear and tear on the invention elements covered by the seal.

Figure 8:
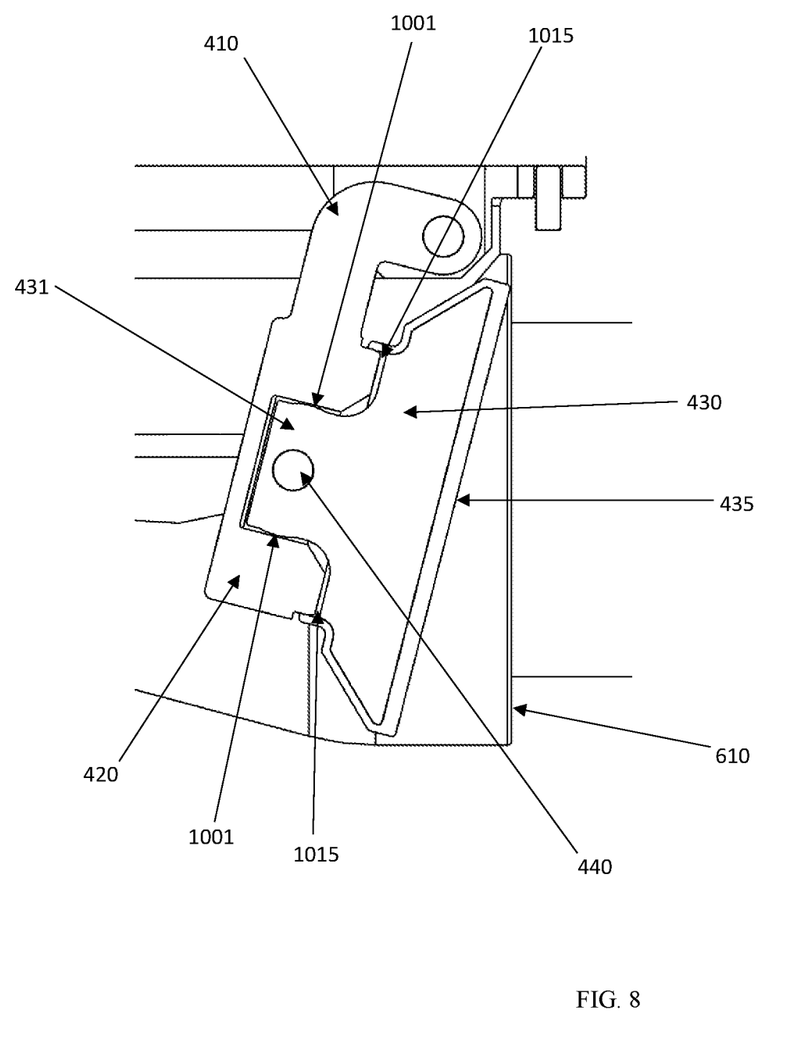
FIG. 8 depicts a cutaway side view of the invention depicting the mounting of the flapper in the swing arm as the flapper makes contact with the valve seat surface.

Referring now to FIG. 7 and FIG. 8, the design of the second end 431 of flapper 430 relative to mounting said second end 431 in the blind hole of flapper mount 420 is described. Referring briefly to FIG. 4, it is noted the blind hole disposed in the flapper mount 420 of swing arm 410 is generally cylindrical in shape. Similarly, the second end 431 of flapper 430 is generally cylindrical in shape and is designed to fit snugly, although not tightly, within the blind hole of the flapper mount 420. As depicted in FIG. 8, the diameter of second end 431 of the flapper 430 is slightly smaller than the diameter of the blind hole in the flapper mount 420 of the swing arm 410. Disposed around the circumference of the second end 431 of the flapper 430 is a bulge 1001 having a generally spherical cross-section. Referring to FIG. 4 again and noting the diameter of pin hole 421 is the same as the diameter of flapper pin 440 so as to ensure a snug fit between those two elements, FIG. 8 then depicts the design of the second end 431 of flapper 430 relative to bulge 1001. The snug fit between pin hole 421 and flapper pin 440 results in the ability of flapper 430 to pivot in a controlled way as the swing arm 410 swings into the closed position against flapper seat 610. Referring to FIG. 8, FIG. 9, FIG. 10 and FIG. 11, pressure from backflow in the pipeline presses the swing arm 410 and flapper 430 against flapper seat 610, compressing elastomeric seal 435 against flapper seat 610. This compression of the elastomeric seal 435 ensures a tight seal between flapper 430 and flapper seat 610.

The pivotal freedom of motion of the flapper 430 and second end 431 on flapper pin 440 when mounted in the blind hole of flapper mount 420 as the swing arm 410 swings to a closed position is depicted in FIG. 8, FIG. 9, FIG. 10 and FIG. 11. This pivotal freedom of motion is fundamental to the invention. Referring first to FIG. 8, it is noted that a gap 1015 exists between the flapper mount 420 and the circular cross section of the conic element of the flapper 430. The gap 1015 is formed based on the length of the second end 431 of the flapper 430 relative to pin hole 421 in the second end 431. The gap 1015 permits flapper 430 to pivot on pivot pin 440 in the flapper mount 420 with the size of the gap 1015 permitting rotational motion of between approximately 3 degrees and 7 degrees. The length of the second end 431 relative to pin hole 421 and likewise relative to the depth of the blind hole in flapper mount 420 causes gap 1015 to be formed. Lengthening the second end 431 could, for example, widen the gap 1015 and allow more rotation, although this may require some reshaping of the second end 431. As the swing arm 410 first swings to a closed position, the gap 1015 is typically approximately the same size between different points of the circular cross section of the flapper 430 and the flapper mount 420. FIG. 8 depicts the closing of the swing arm 410 and flapper 430 assembly at the point at which the elastomeric seal first makes contact with flapper seat 610.

Figure 9:
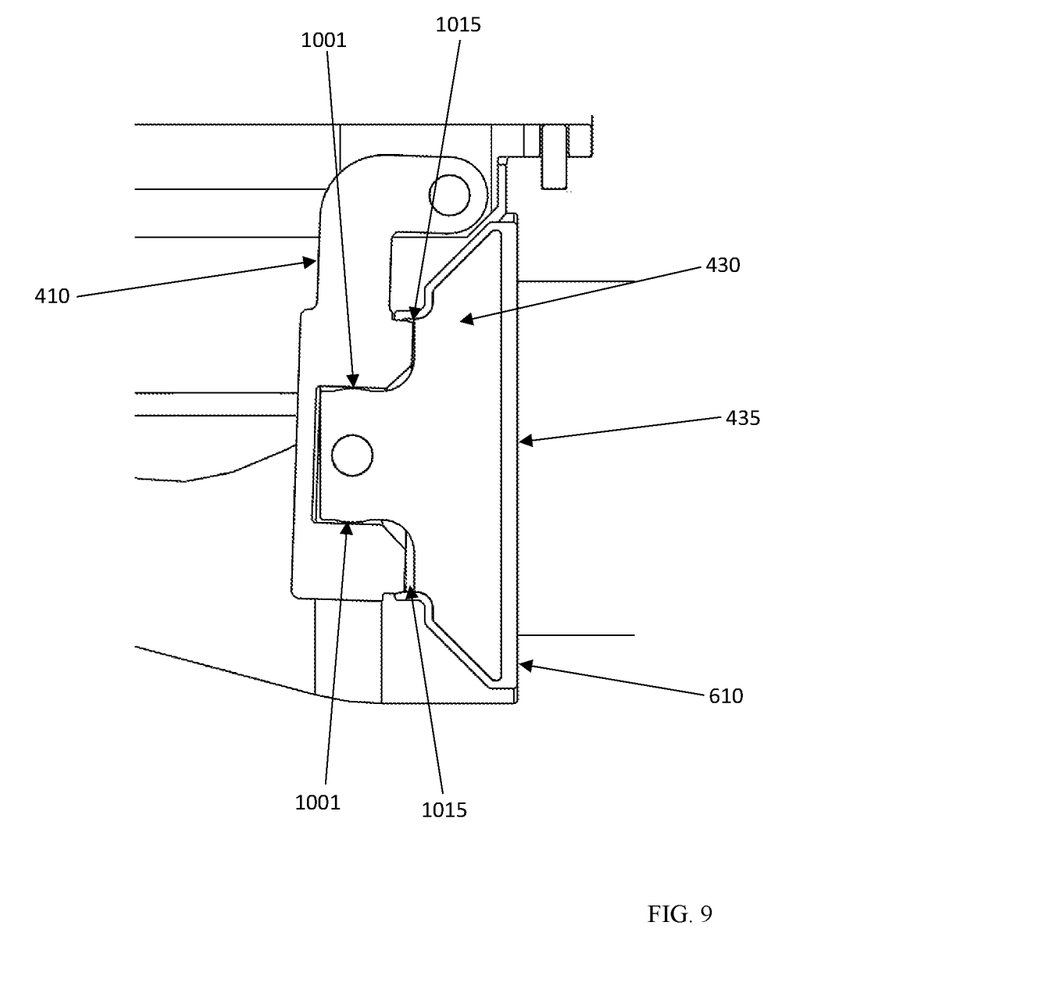
FIG. 9 depicts a cutaway side view of the invention depicting the mounting of the flapper in the swing arm as the flapper is pressed into the valve seat surface.

Referring now to FIG. 9, swing arm 410 has moved the flapper 430 fully over flapper seat 610, although the elastomeric seal 435 is not begun to be compressed. When the elastomeric seal 435 of the flapper 430 makes full contact (with no compression) with the flapper seat 610, it is seen swing arm 410 and flapper 430 are oriented such that gap 1015 is not even across the interface between the mounting piece 420 and circular cross section of the flapper 430. In this position, the gap 1015 is narrower in one area (top) and wider in another (bottom). Nonetheless, elastomeric seal 435 encloses the entire gap 1015. Likewise, bulge 1001 is in contact with the side wall of blind hole of the flapper mount 420. The elastomeric properties of the elastomeric seal 435 as well as the ability of the bulge 1001 to maintain contact with the sides of the blind hole as the second end 431 pivots on the pivot pin 440 ensures there is some resistance to the motion of the flapper 430 as it makes contact with the flapper seat 620. For clarity, as the swing arm 410 swings to close the flapper 430 onto the flapper seat 610, the flapper 430 pivots to the extent gap 1015 permits. But this pivoting is regulated by the elastomeric properties of the elastomeric seal 435 and the contact between the bulge 1001 and the sides of the blind hole. Comparing gap 1015 between FIG. 8 and FIG. 9, in FIG. 8 gap 1015 is substantially the same on both sides of flapper 430 relative to flapper mount 420. As depicted in FIG. 9, as the flapper 430 makes full contact with the flapper seat 610 prior to any compression of the elastomeric seal 435, gap 1015 on one side of the flapper 430 relative to the flapper mount 420 is substantially larger than the gap 1015 on the other side of the flapper 430 relative to flapper mount 420. The two pivot points of the flapper assembly 400 are pivoting separately but functionally together to seat the flapper 430 on valve seat 610.

Figure 10:
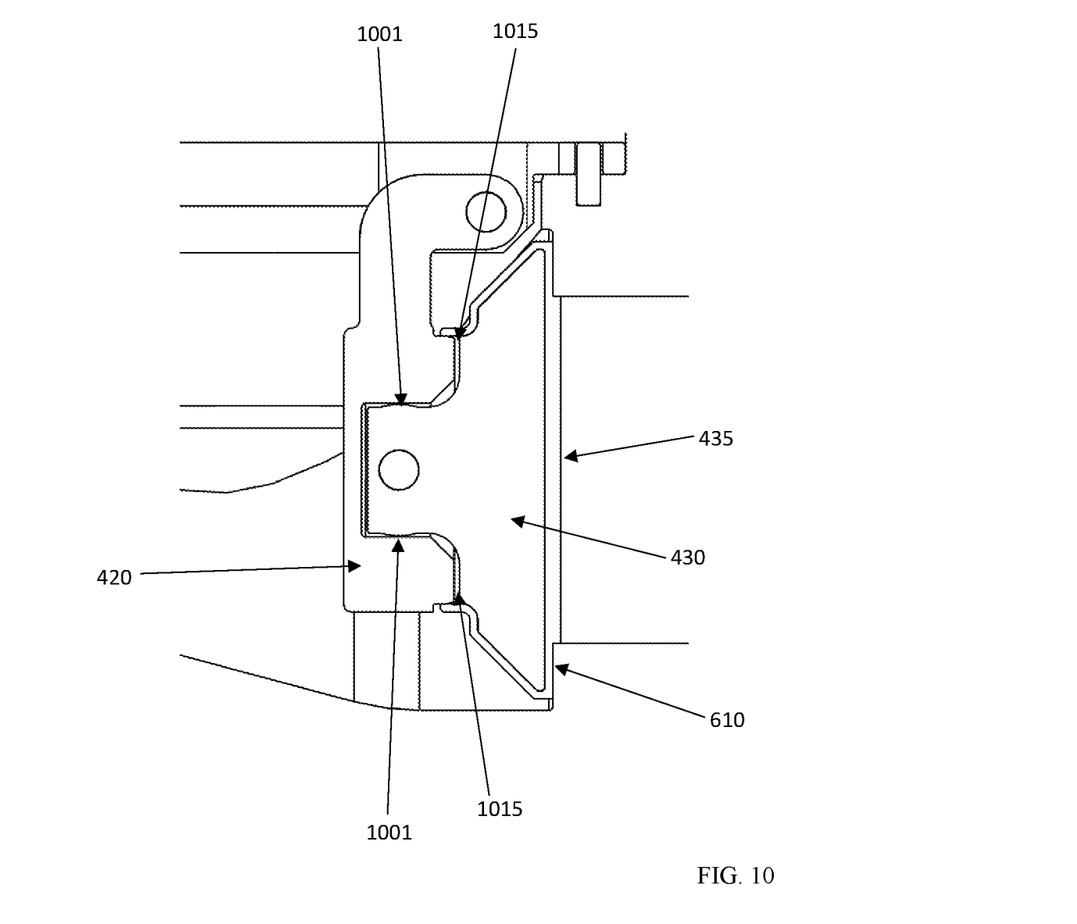
FIG. 10 depicts a cutaway side view of the invention further depicting the mounting of the flapper in the swing arm as the flapper is further pressed into the valve seat surface.

Referring now to FIG. 10, backflow pressure (not depicted) has compressed the elastomeric seal partially between the flapper 430 and the flapper seat 610. In partial compression of the elastomeric seal 435, it is seen in FIG. 10 that bulge 1001 remains in contact with the sides of the blind hole and gap 1015 is now approximately even between flapper 430 and flapper mount 420. In a flapper 430 with a like-new elastomeric seal 435, this is generally the final working position of the flapper assembly 400 during use. The swing arm 410 is generally parallel to the flapper 430, which itself is parallel to the valve seat 610.

Figure 11:
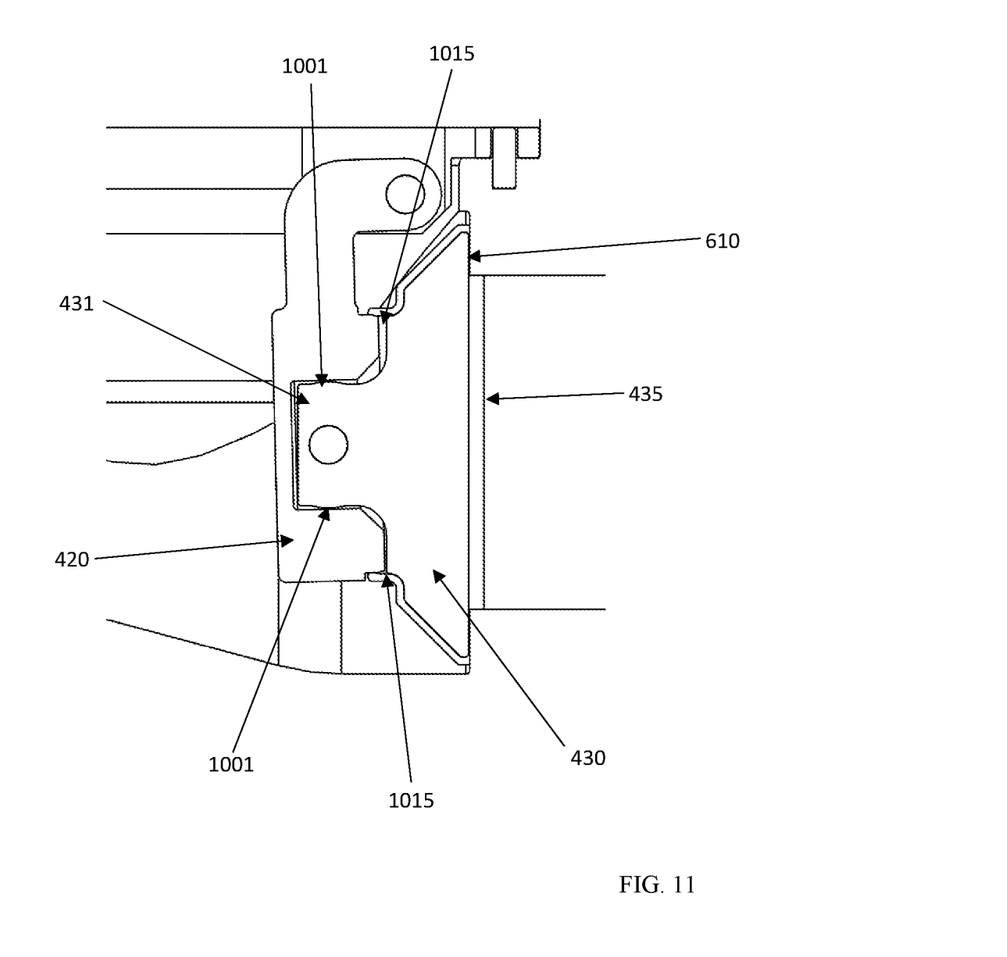
FIG. 11 depicts a cutaway side view of the invention further depicting the mounting of the flapper in the swing arm as the flapper is fully pressed against the valve seat surface.

Referring now to FIG. 11, when an elastomeric seal 430 has become worn, backflow pressure may fully compress the elastomeric seal 435 between the flapper 430 and the flapper seat 610. With the elastomeric seal 435 fully compressed to prevent backflow, it is seen that the bulge 1001 remains in contact with the sides of the blind hole in the flapper mount 420. The gap 1015 has returned to being unequal across the space between flapper 430 and flapper mount 420. Swing arm 410 can continue to pivot on pivot pin 407 and the second end 431 of the flapper 430 can continue to pivot on pivot pin 440 to ensure a seal even with a worn elastomeric seal 435.

By incorporating two degrees of freedom of motion, the flapper assembly 400 is functional through the life of the elastomeric seal 435.

Although pivot pin mount 411 with pin hole 412 are depicted as parallel to partially threaded hole 421 in flapper mount 420, this is not a limitation. While pivot pin mount 411 must be oriented to permit the swing arm 410 to fall into place, partially threaded hole 421 may be oriented along any diameter of the flapper mount 420, including perpendicularly to the orientation of pivot pin mount 411.

Figure 6:
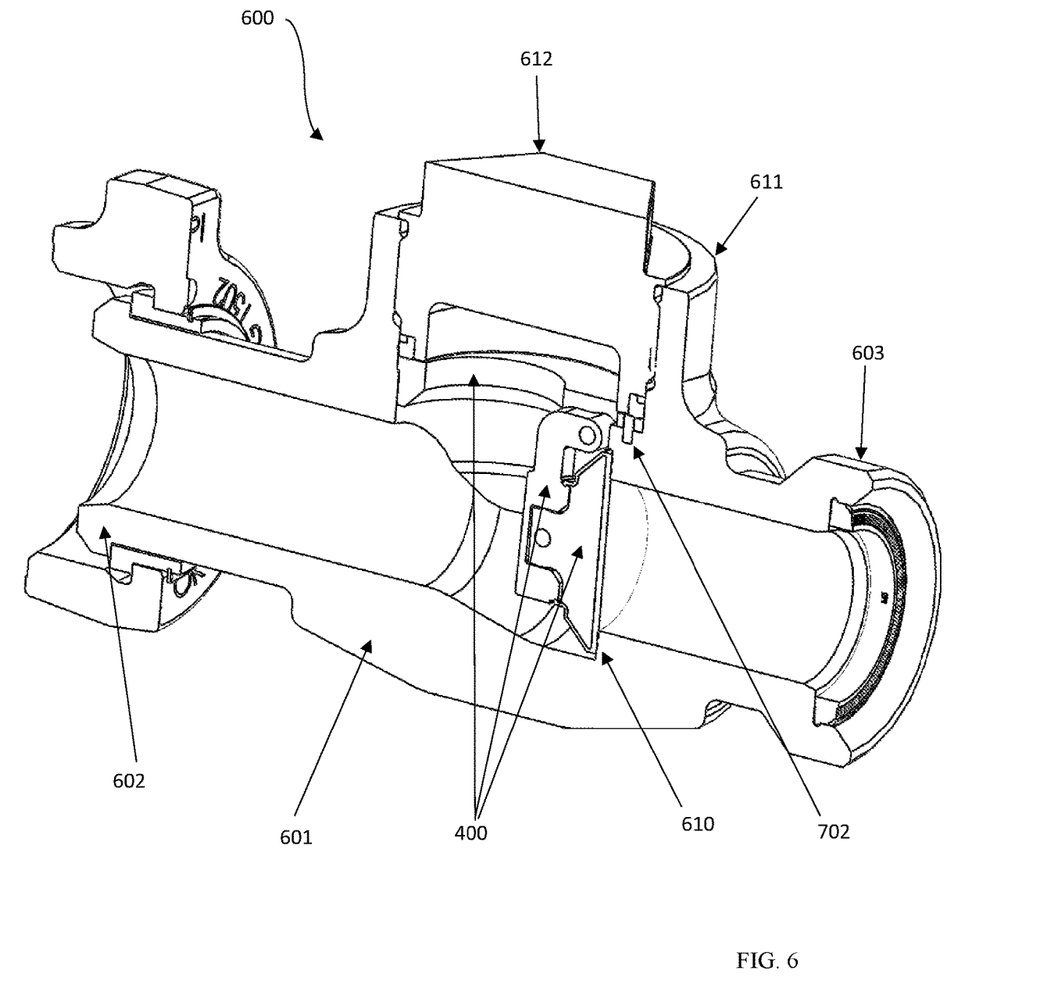
FIG. 6 depicts a cutaway perspective view of the invention in a valve assembly.

Referring now to FIG. 6, the mounting piece 600 for the flapper assembly 400 is described. FIG. 6 depicts a cut-away view of mounting piece 600. Mounting piece 600 comprises a short length of pipe 601 having a first end 602 and a second end 603. Mounting piece 600 is designed to function as the body of a check valve suitable to permit fluid flow in a favored direction but to stop flow in a disfavored direction. Each of the first end 602 and second end 603 is designed to be sealably attached to one end of a gap in a pipeline (not depicted) used for transporting fluids, such as oil. Suitable methods for sealable attachment of the first end 602 and second end 603 include threaded connection, compression connection or otherwise. Pipe 601 is described in general as a hollow cylindrical tube suitable to permit fluid flow. Fluid flow in pipe 601 flows from the second end 603 to the first end 602. This would be considered the "favored" direction of flow, as identified previously herein. Fluid flow from the first end 602 to the second end 603 would be considered "disfavored," as previously identified.

Disposed in one side of pipe 601 approximately midway between the first end 602 and second end 603 is a threaded valve nut mount 611. As seen in FIG. 6, threaded valve nut mount 611 acts as an access port for the insertion of flapper assembly 400. Mounting piece 600 further comprises a threaded valve nut 612, which is threaded into the threaded valve nut mount 611 to secure the flapper assembly 400 in place and to prevent oil spillage out of the valve nut mount 611. While threading is one possible way to secure a valve nut in a valve nut mount, other attachment methods may be used.

Threaded valve nut mount 611 is generally a hole sized to permit the full and functional insertion of the flapper assembly 400 as depicted in FIG. 6. Referring also to FIG. 5 and FIG. 7, mounting ring 401 of the flapper assembly 400 has disposed therein an alignment hole 501. Referring also to FIG. 5, alignment hole 501 is sized to permit the insertion of an alignment pin 702 through alignment hole 501 and into a similar alignment hole in the mounting piece 601 as depicted in FIG. 6. This ensures flapper assembly 400 is properly installed in only one orientation in pipe 601. It can further be seen in FIG. 6 that a portion of the wall of pipe 601 is thicker around the circumference of the pipe 601 around the area where threaded valve nut mount 611 is disposed to ensure the structural integrity of pipe 601. FIG. 6 further identifies the flapper seat 610, previously described relative to the operation of the invention. Although in FIG. 6 the flapper seat 610 is depicted as integral to pipe 601, as depicted in prior art FIG. 1, the valve seat 610 can be disposed on a surface of a threaded valve seat nut (such as part 103 in FIG. 1). Having such a separate valve seat permits replacement thereof from time-to-time in the event of damage to the valve seat that permits unwanted back flow.

Referring still to FIG. 6, the installation and operation of the flapper assembly 400 within the mounting piece 600 is described. Mounting piece 600 is attached to a pipeline by attaching first end 602 to one end of a gap in a pipeline and second end 603 to the other end of a gap in a pipeline. Threaded valve nut 612 is removed from threaded valve nut mount 611 to permit the working insertion and installation of the flapper assembly 400 into the mounting piece 600 as shown. Proper alignment, as described above, is essential. Referring also to FIG. 4, when a fluid, such as oil, is pumped through the pipeline in the favored direction (from the direction of the second end 603 of the mounting piece 600 to the first end 602 thereof), the fluid flow pushes the flapper 430 and swing arm 410 out of the flow by pivoting the swing arm 410 on pin 407. Mounting ring 401 is designed with a hole or space therein to permit the swing arm 410 to be maintained during operation in the hole or space in the center of mounting ring 401.

Figure 12:
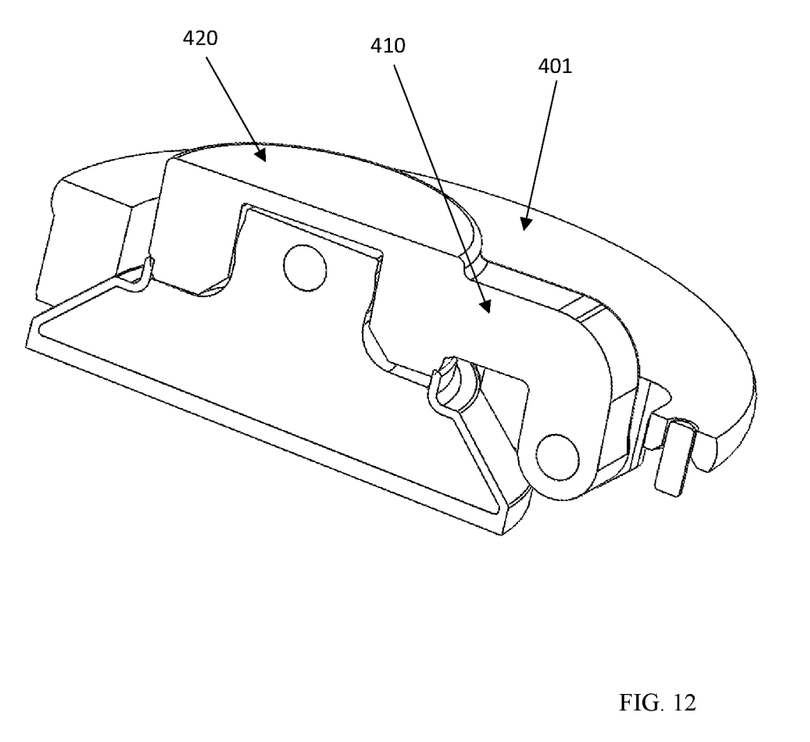
FIG. 12 depicts a cutaway perspective view of the flapper arm assembly raised into the retaining ring as during operation.

Referring to FIG. 12, a cutaway view of the mounting ring 401 with swing arm 410 in position in the hole of the mounting ring 401 during fluid flow is depicted. Likewise, flapper mount 420 fits into the hole of mounting ring 401.

In the event flow in the favored direction stops, the loss of fluid flow permits gravity to cause the flapper assembly 400 to drop from its position in the hole in the mounting ring 401 and fall toward the flapper seat 610. Backflow then presses the flapper seal 435 against the flapper seat 610 as previously described. In alternate embodiments, for a spring-loaded flapper and swing arm, flow pushes the flapper and spring arm out of the way of the flow and extends the spring, therein imparting potential energy into it. In the event of a loss of flow, potential energy in the spring causes the flapped and swing arm to move into a closed position to prevent back flow.

We claim:

1. A flapper assembly for a fluid check valve comprising a generally conical flapper having a conical element and a flat element, an L-shaped swing arm having a first end and a second end, two pivot pins, an elastomeric seal and a mounting ring in which:
   the conical element of the generally conical flapper is pivotably attached to the second end of the L-shaped swing arm,
   the first end of the L-shaped swing arm is pivotably attached to the mounting ring and
   the elastomeric seal is disposed over the flat element of the generally conical flapper, over the conical element of the generally conical flapper and further disposed over at least part of the second end of the L-shaped swing arm in order to seal the connection between the generally conical flapper and the second end of the L-shaped swing arm.

2. The flapper assembly of claim 1 in which the conical element of the generally conical flapper comprises a mounting end and further in which the second end of the L-shaped swing arm is shaped to permit the mounting of the mounting end of the conical element of the generally conical flapper to the second end of the L-shaped swing arm using a pivot pin.

3. The flapper assembly of claim 2 in which the shape of the second end of the swing arm and the shape of the mounting end of the conical element of the generally conical flapper enable a secure seal by the elastomeric seal.

4. The flapper assembly of claim 2 in which the mounting end of the conical element of the generally conical flapper comprises a generally cylindrical mount further comprising a generally spherical bulge disposed circumferentially around the generally cylindrical mount and suitable to control the pivot of the generally conical flapper in the second end of the swing arm.

5. The flapper assembly of claim 1 in which the pivotable attachment between the first end of the swing arm and the mounting ring pivots at least 90 degrees.

6. The flapper assembly of claim 1 in which the pivotable attachment between the second end of the swing arm and the generally conical flapper pivots between 3 degrees and 7 degrees.

7. The flapper assembly of claim 1 in which each of the pivot pins is retained by a set screw.

8. The flapper assembly of claim 1 in which the flapper assembly further comprises a check valve body having a closeable access port and flapper seat and which is suitable to retain the flapper assembly for operation.

9. A mounting for a flapper of a flapper assembly for a fluid check valve comprising:
   a generally conical flapper having a flat element and a conical element in which the conical element of the generally conical flapper further comprises a generally cylindrical mounting element;

in which the generally cylindrical mounting element of the generally conical flapper further comprises a generally spherical bulge disposed circumferentially around the generally cylindrical mounting element an L-shaped swing arm having a first end and a second end in which the second end is shaped to allow the pivotable mounting of the generally cylindrical mounting element and generally spherical bulge of the generally conical flapper using a pivot pin and pivot pin hole suitable to connect the flapper to the second end of the L-shaped swing arm and an elastomeric seal covering the generally conical element of the flapper and extending to cover at least part of the second end of the L-shaped swing arm in order to seal the connection between the generally conical flapper and the second end of the L-shaped swing arm.

10. A flapper assembly for a fluid check valve in which the flapper assembly provides two degrees of freedom of motion, comprising:

a mounting ring having a mount thereon for the pivotable attachment of an L-shaped swing arm, an L-shaped swing arm having a first end suitable to be pivotably mounted to the mounting ring and a second end suitable to be pivotably mounted to a flapper having a mount suitable to be pivotably mounted to the second end of the L-shaped swing arm in which a first pivot point between the mounting ring of the flapper assembly and the first end of the swing arm permits pivotal motion of at least 90 degrees and a second pivot point between the second end of the swing arm and the mount of the flapper in which the second pivot point permits pivotal motion of at least 3 degrees and less than or equal to 7 degrees;

in which an elastomeric seal seals the connection between the flapper and at least part of the second end of the L-shaped swing arm.

\* \* \* \* \*